(12) United States Patent
Wharton

(10) Patent No.: US 8,225,931 B2
(45) Date of Patent: Jul. 24, 2012

(54) DRAWER-AND-SHELL TYPE PACKAGE

(75) Inventor: Burgo Wharton, London (GB)

(73) Assignee: Duff Design Limited, London (GB)

( * ) Notice: Subject to any disclaimer, the term of this patent is extended or adjusted under 35 U.S.C. 154(b) by 696 days.

(21) Appl. No.: 12/161,755

(22) PCT Filed: Jan. 23, 2007

(86) PCT No.: PCT/GB2007/000223
§ 371 (c)(1),
(2), (4) Date: Jul. 22, 2008

(87) PCT Pub. No.: WO2007/083156
PCT Pub. Date: Jul. 26, 2007

(65) Prior Publication Data
US 2010/0230316 A1 Sep. 16, 2010

(30) Foreign Application Priority Data

Jan. 23, 2006 (GB) .................................. 0601300.7

(51) Int. Cl.
*B65D 73/00* (2006.01)
(52) U.S. Cl. ........................................ 206/468; 206/462
(58) Field of Classification Search .................. 206/242, 206/307, 307.1, 462, 467, 745, 308.1, 312; 220/23.89, 23.88, 23.87, 23.83, 507, 503, 554, 345.5, 504; 312/273, 286, 310
See application file for complete search history.

(56) References Cited

U.S. PATENT DOCUMENTS 6,557,700 B1 * 5/2003 Wharton .................... 206/308.1

FOREIGN PATENT DOCUMENTS

| WO | WO9824696 | 6/1998 |
| WO | WO0038999 | 7/2000 |

* cited by examiner

*Primary Examiner* — Steven A. Reynolds
*Assistant Examiner* — King M Chu
(74) *Attorney, Agent, or Firm* — Dinsmore & Shohl LLP

(57) ABSTRACT

A package (10) comprising a belt (42) extending between a first end (37) and a second end (39) of a belt path; and first and second tab members (14, 16) attached to the belt (42) such that when the first tab member (14) is moved in a first direction, the second tab member (16) is driven by the belt (42) to move in a second direction different to the first direction. The tab members (14, 16) are attached to the belt (42) by respective bonds (45, 46), the movement of the tab members (14, 16) in either direction being delimited by at least one bond reaching an end of the belt path; and when at least one of the tab members is in a closed position, said bond is positioned inwardly from the ends of the belt path so that said tab member can move in both the first and second directions from the closed position before the bond reaches an end of the belt path to delimit said movement.

19 Claims, 7 Drawing Sheets

(a)

(b)

(c)

(a)

(b)

(c)

DRAWER-AND-SHELL TYPE PACKAGE

The present invention relates to packaging, such as a box, which may be used in the packaging of any item. Examples are the packaging of pharmaceutical products, mobile telephones, mp3 players, portable computer games consoles, compact discs, digital video discs, chocolates, cosmetics, cigarettes, swatch samples and information cards.

Pharmaceutical products such as tablets and capsules are often packaged in blister packs. Blister packs comprise a moulded plastic base having raised areas or blisters for containing the tablets or capsules, and the base is covered by foil. Blister packs are usually packaged in a box together with a leaflet containing information about the medication.

Packaging is important when marketing a product as good packaging may result in increased sales of the product. Good packaging should hold items securely, but also be easy and convenient to open by people of all levels of ability and dexterity. In addition to these functional attributes, good packaging should also have an attractive appearance and, preferably, intriguing characteristics.

EP1140639 of the Applicant, the subject matter of which is incorporated into this specification by reference, describes a box comprising a generally tubular sleeve defining a through passage, a planar divider extending across said passage, a belt extending around said divider, and a tray member extending into said passage, characterised in that the box further comprises a tab member extending into said passage, and wherein each of said tray member and said tab member are attached to said belt, such that when said tab member is moved out of said passage in a first direction said tray member moves out of said passage in a second direction opposite to said first direction, and said belt is in the form of a continuous loop such that when said tab member is moved into said passage in said second direction said tray member moves into said passage in said first direction.

The box of EP1140639 is appealing as a user is surprised, upon first opening the box, that the tray moves automatically in the opposite direction when the tab member is pulled.

The Applicant has also devised an improved box or package, which is described in UK patent application GB 0519581.3, published as GB 2428236, the subject matter of which is incorporated into this specification by reference, and which includes first and second tab members which lie substantially on the same plane as each other, and a means for driving the movement of one of the tab members, wherein the tab members are arranged to co-operate with the drive means such that moving the first tab member in a first direction causes the second tab member to move in a second direction opposite to said first direction, said movement of the tab members being in a plane parallel to the plane on which the tab members lie.

GB 0519581.3 also describes a further improved package comprising an open-ended sleeve, a tab member moveable in and out of the sleeve through the open end, and a lid moveable in response to said movement of the tab member, the lid being moveable between a closed position in which the lid substantially covers the open end when the tab member is within the sleeve and an open position in which the lid allows the tab member to protrude from the sleeve through the open end, wherein the lid is a web having opposed ends that at one end joins the sleeve at a first hinge and at another end joins the tab member at a second hinge such that relative movement of the second hinge with respect to the first hinge drives said movement of the lid.

It is an object of the invention to provide improved packaging, which is even more interesting, attractive and/or surprising than the prior art.

The invention provides a package comprising a belt extending between a first end and a second end of a belt path; and first and second tab members attached to the belt such that when the first tab member is moved in a first direction, the second tab member is driven by the belt to move in a second direction different to the first direction; wherein the tab members are attached to the belt by respective bonds, the movement of the tab members in either direction being delimited by at least one bond reaching an end of the belt path; and when at least one of the tab members is in a closed position, said bond is positioned inwardly from the ends of the belt path so that said tab member can move in both the first and second directions from the closed position before the bond reaches an end of the belt path to delimit said movement.

The package is particularly suitable for packaging pharmaceutical products, although the invention is not limited to such applications. For example, one or both tab members may comprise a blister pack containing tablets or capsules. The blister pack may be attached directly to the belt by a bond, the blister pack thereby forming a tab member. One or both of the tab members may also be printed with information regarding the medication. Conveniently, therefore, the information is always kept together with the medication.

Preferably, the bond that delimits movement of the or each tab member is positioned substantially midway between the ends of the belt path when at least one of the tab members is in the closed position. This means that the or each tab member has an equidistant distance from the closed position until its or their movement is delimited by at least one bond reaching an end of the belt path. By virtue of this arrangement, said tab member can move from the closed position in both the first direction and the second direction.

In other embodiments of the invention, the bonds may be offset from one another along the length of the belt path when at least one of the tab members is in the closed position. This arrangement provides the package with an asymmetric opening characteristic, whereby the or each tab member can be moved to a different maximum extent in the first and second directions respectively.

Preferably, when one of the tab members is in its closed position, said tab member overlies the belt path, and when both of the tab members are in their closed positions, the tab members together sandwich the belt path. The or each tab member is longer than or equal to the length of the belt path.

Advantageously, the package comprises a sleeve having opposed open ends, wherein at least one of the tab members is wholly or substantially within the sleeve when in the closed position and can protrude from the sleeve through one or other of the open ends when moved in either of the first and second directions. The or each tab member may be shorter than or equal to the length of the sleeve. In some embodiments of the invention, one or both of the tab members may include extended portions which protrude from the sleeve when said tab member is in the closed position, thereby enabling a user easily to grasp and pull the extended portion to open the package.

In the package comprising the sleeve, when both of the tab members are in their closed positions, upper and lower walls of the sleeve together sandwich the tab members and the belt path.

Preferably, the first and second directions are opposing directions whereby the first and second tab members are caused to move away from and towards each other, and the belt is a continuous loop which extends around a planar divider.

In this way, a tab member which is enclosed within the sleeve of the package when in the closed position can be caused to protrude from the sleeve through one or other of the open ends when moved in either of the first and second directions. This has the advantage that a tab member can be accessed from two ends of the package.

When the tab member is a tray, this means that the contents of the tray can also be accessed from two ends of the package. If the bonds which delimit movement are each positioned substantially midway between the ends of the belt path when the tab members are in closed positions, then the package construction may be particularly suited to supporting and storing heavy objects as a maximum of only approximately half the length of the tray member can protrude from the sleeve in either direction as further movement of the tray member is delimited by at least one bond reaching an end of the belt path.

If, however, the bonds are offset from one another when the tab members are in closed positions, then the first and second tab members can each protrude from the sleeve to different maximum extents when moved in the first and second directions respectively.

This arrangement is particularly suitable for packaging tablets or capsules. For example, if one or both of the tab members is a blister pack, then opening the package in one direction may provide access to fewer tablets or capsules in the blister pack than when the package is opened in the other direction. The package may be arranged such that tablets which are for taking during the day can be accessed when the package is opened in one direction, and tablets which are for taking during the night can be accessed when the package is opened in the other direction. This helps the user to distinguish between different types of tablet; moreover, it suits an arrangement in which more of one kind of tablet are required than the other type of tablet.

In order that this invention may be more readily understood, currently preferred embodiments will now be further described by way of example with reference to the accompanying drawings, in which:

FIGS. 1(a) to 1(c) are perspective views of a box, according to an embodiment of the invention, including first and second tab members, a divider and a sleeve, when the tab members are (a) in a closed position, (b) open in a first direction, and (c) open in a second direction;

Figure 4:
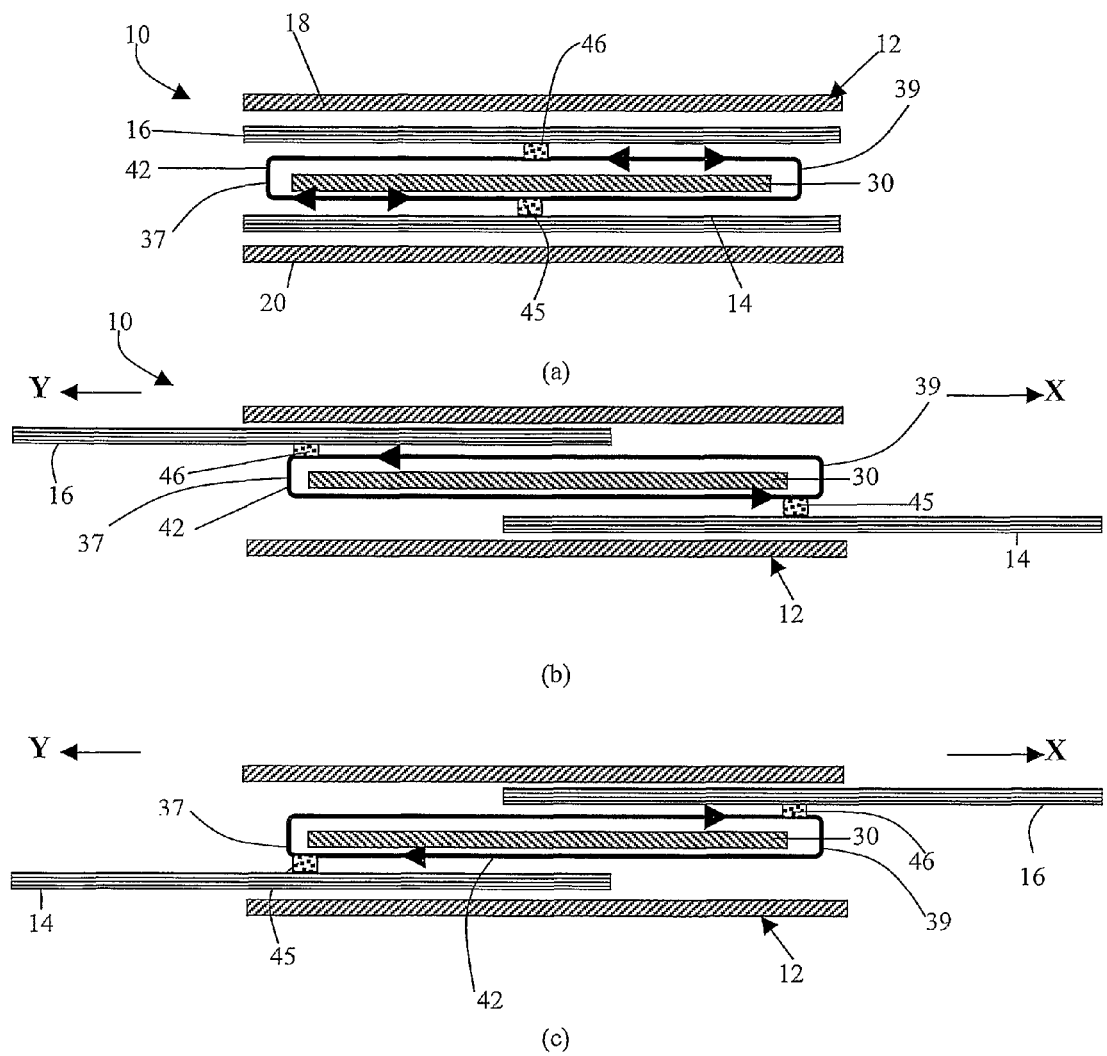
Figure 5:
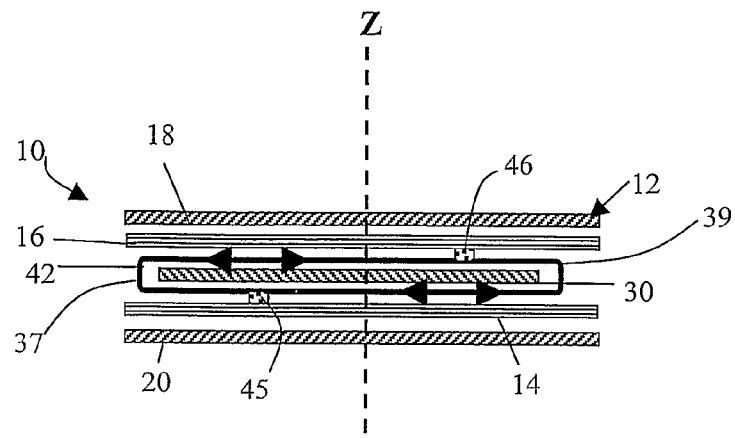
Figure 5:
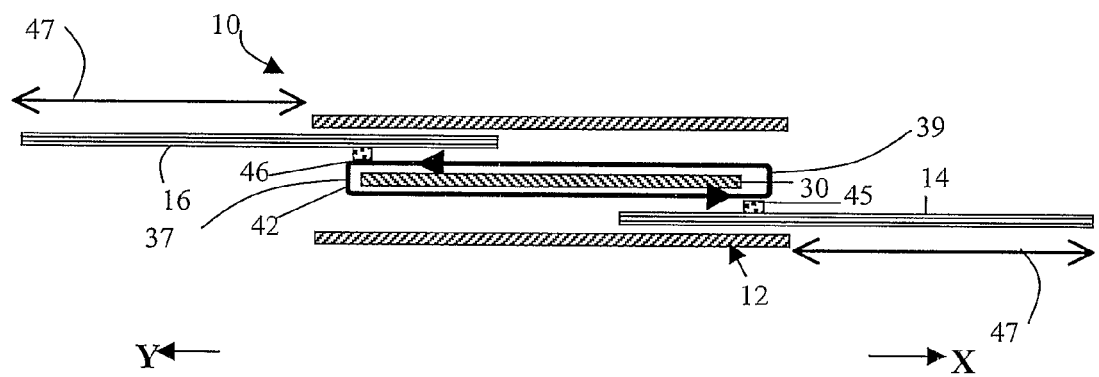
Figure 5:
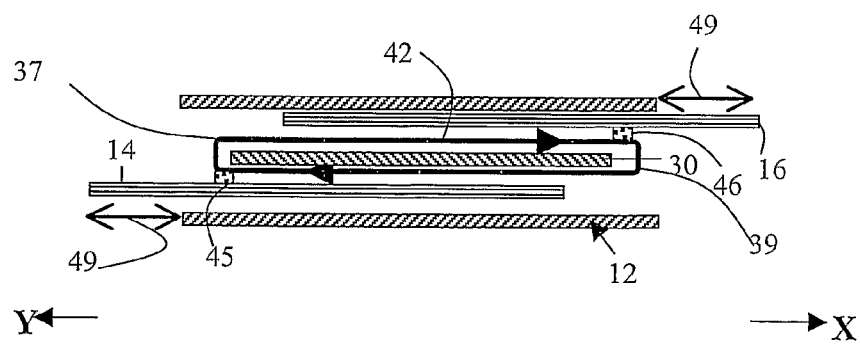
Figure 7:
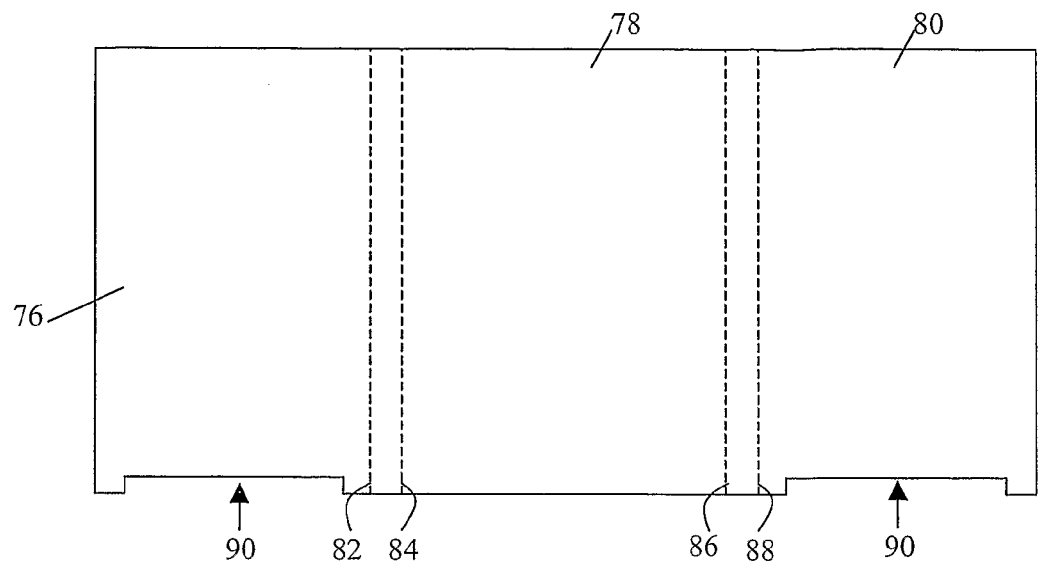
Figure 8:
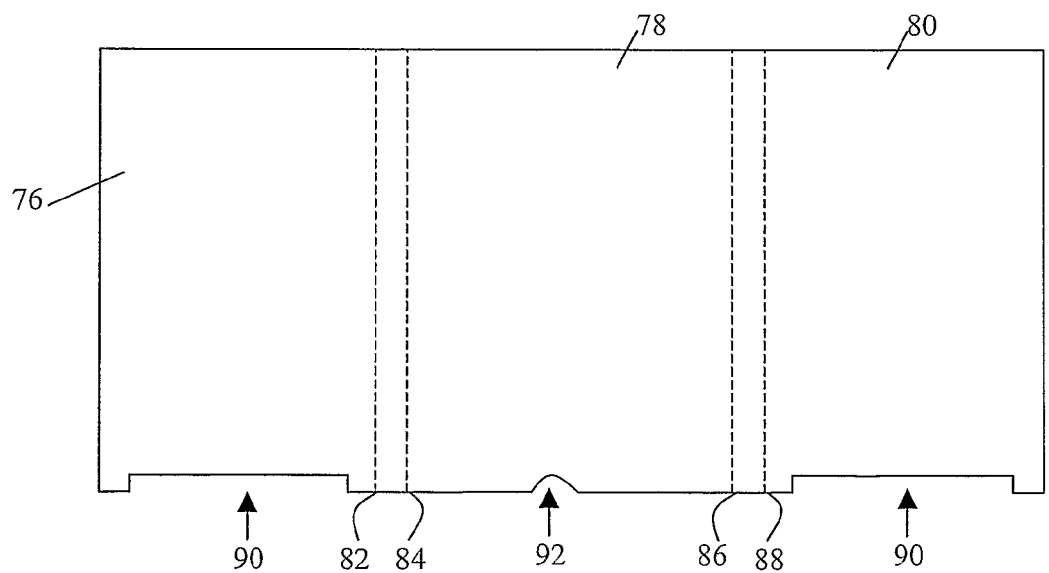

FIGS. 4(a) to 4(c) are schematic cross-sections on line A-A of the box of FIG. 1(a), when the tab members are (a) in a closed position, (b) open in the first direction, and (c) open in the second direction;

FIGS. 5(a) to 5(c) are cross-sections similar to those of FIG. 4, but of an alternative embodiment of the invention;

FIGS. 6(a) to 6(c) are cross-sections similar to those of FIGS. 4 and 5, but of a further embodiment of the invention;

FIG. 7 is a plan view of a blank of a sleeve of a box according to any embodiment of the invention; and FIG. 8 is a plan view of a blank of a variant of the sleeve of FIG. 7.

Figure 1:
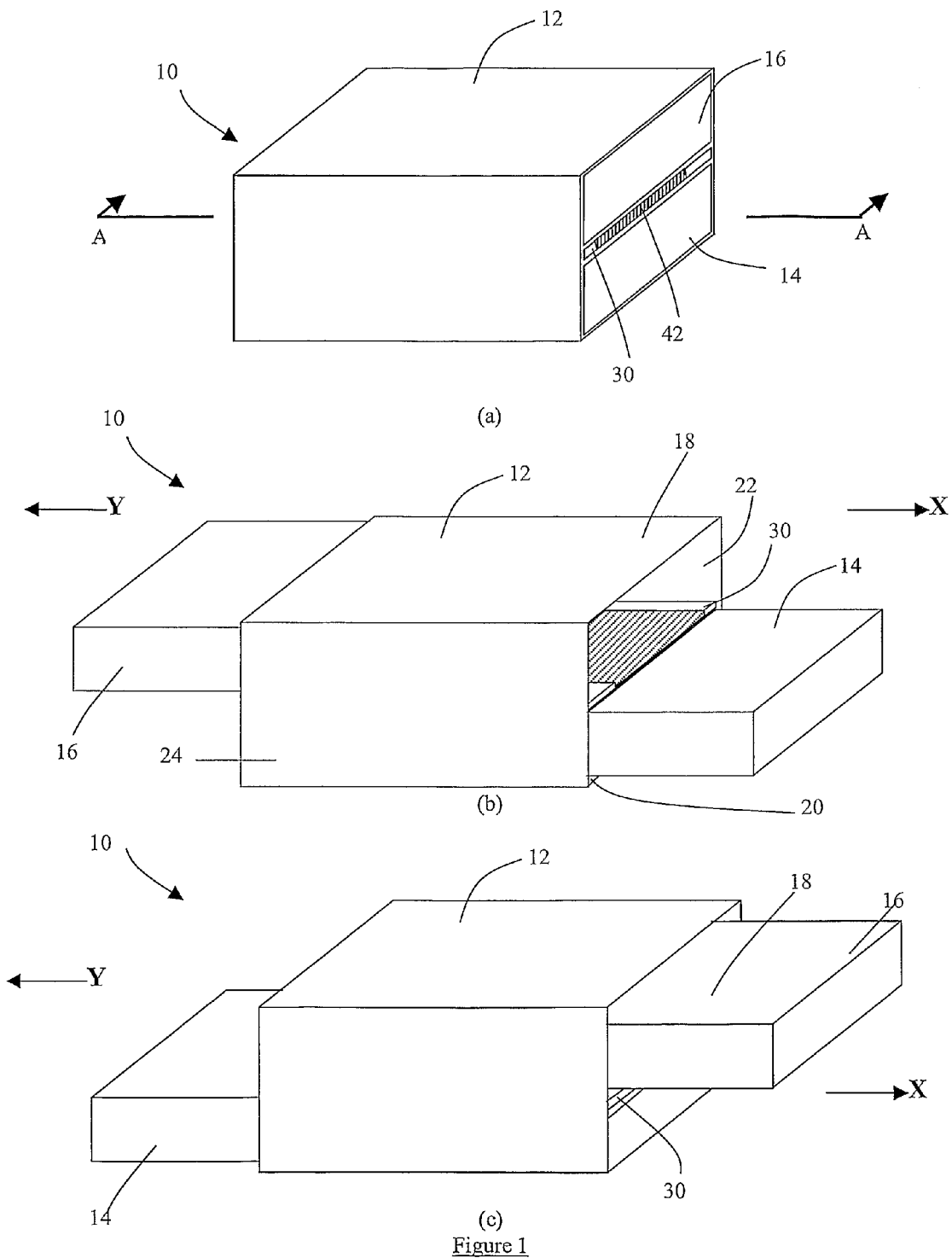
Figure 2:
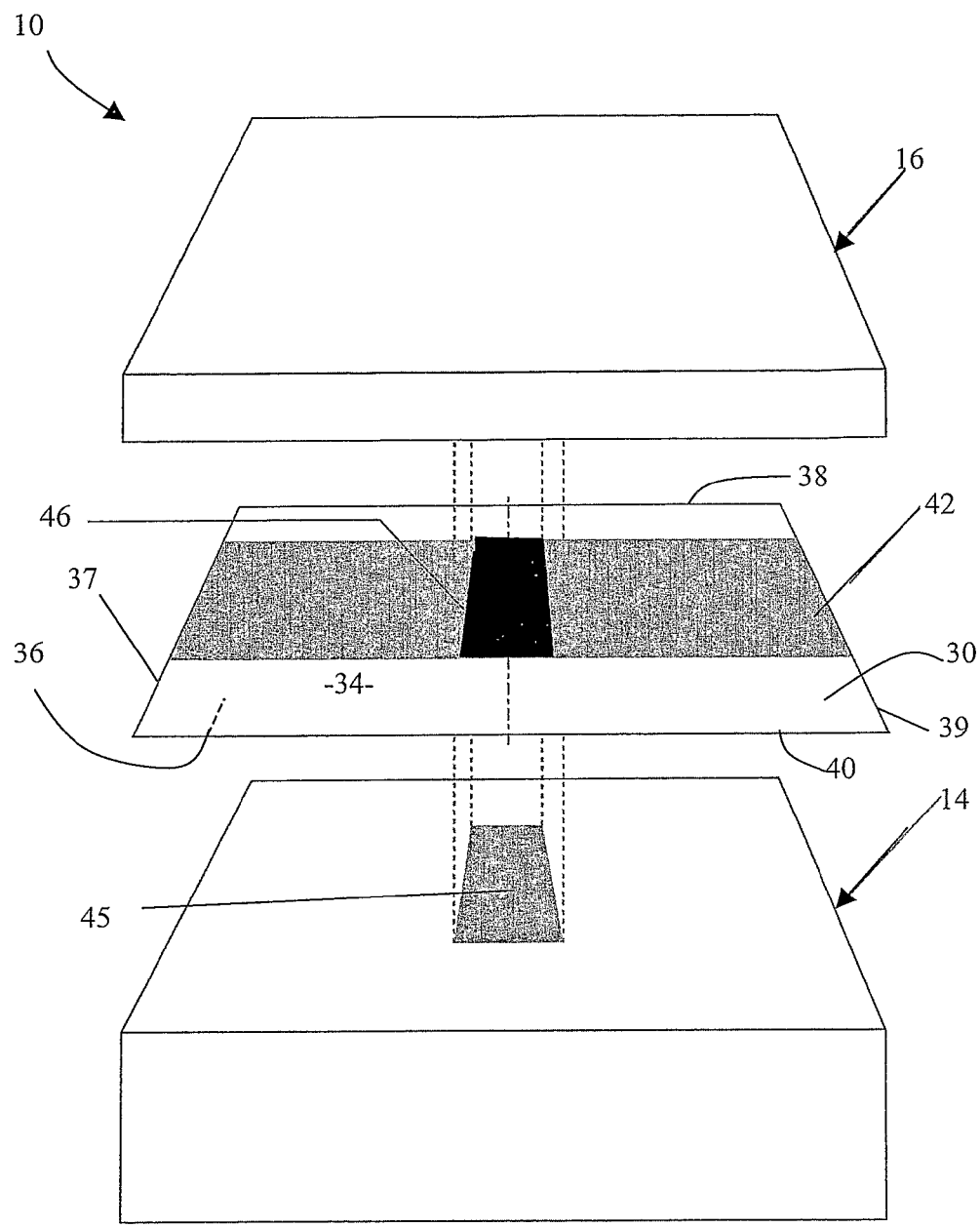
FIG. 2 is an exploded perspective view of the box of FIG. 1, with the sleeve omitted for clarity.
Figure 3:
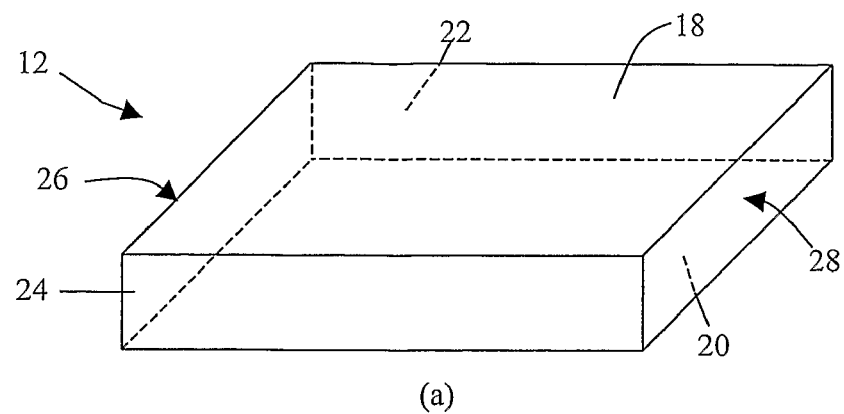
FIG. 3(a) is a perspective view of the sleeve of a box according to an embodiment of the invention.
FIG. 3(b) is a plan view of an upper face of a divider suitable for boxes of the invention.
FIG. 3(c) is a perspective view of a tab member suitable for boxes of the invention.
Figure 3:
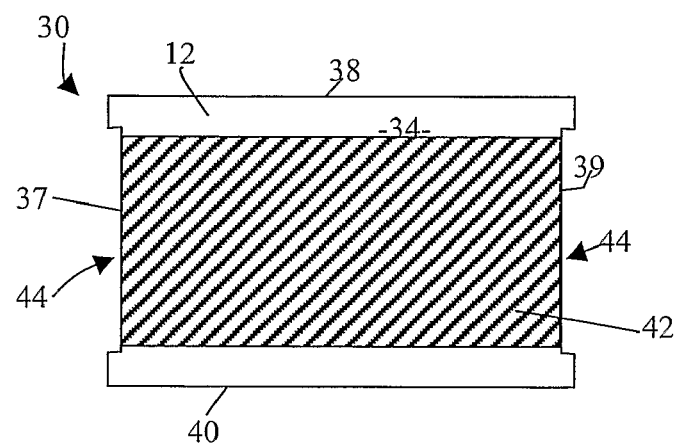
Figure 3:
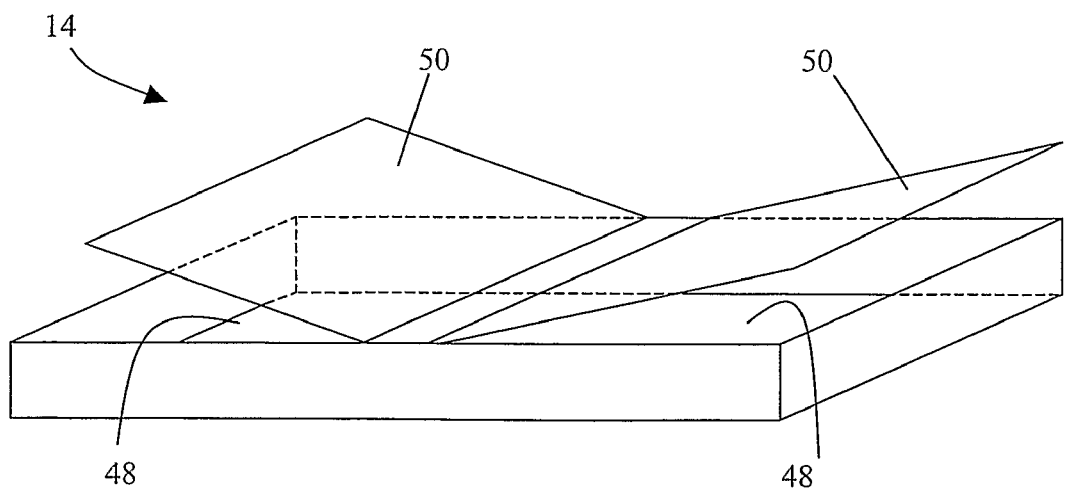

Referring initially to FIGS. 1 and 2, there is shown a box 10 suitable for packaging and/or for display purposes. The box 10 includes a hollow rectangular body or sleeve 12 defining a through passage for housing a first tab member 14 and a second tab member 16. As can best be seen in FIG. 3(a), the sleeve 12 has an upper wall 18, a lower wall 20, two side walls 22, 24 and two open ends 26, 28. The box 10 also includes a planar divider 30 extending across the passage, between the open ends 26, 28 of the sleeve 12, and dividing the passage into upper and lower passages. The tab members 14, 16 extend the length of the through passage and, in this embodiment, are dimensioned so that they can be accommodated wholly within the sleeve 12. The first tab member 14 is housed in the lower passage, and the second tab member 16 is housed in the upper passage. The tab members 14, 16 are movable back and forth, relative to the divider 30 and the sleeve 12, towards and away from one another.

As can be most clearly seen in FIGS. 2 and 3(b), the divider 30 has upper and lower faces 34, 36, two side edges 38, 40 and two ends 37, 39, and is substantially rectangular. The divider 30 has a band or belt 42, narrower than the divider 30, which extends around the divider 30 on a belt path (shown only in FIG. 3(b)) defined by the divider 30. The ends of the belt 42 are joined to form a continuous loop. The belt path is defined by a waist across the two ends 37, 39 defined by cut-out portions 44 at each end 37, 39 of the divider 30 which serves to restrain the belt 42 against lateral movement with respect to the divider 30. The divider 30 is attached or bonded to the sleeve 12 by means of adhesive (not shown) located adjacent to the side edges 38, 40 of the divider 30, or in any other convenient position. Alternatively, the divider 30 and the sleeve 12 may be integral.

The belt 42 is typically a strip of a low-friction sheet material such as plastics film, e.g. Cellophane™ or Treofan GND™, or a material with a low-friction coating such as PTFE. The belt material is selected so that the belt 42 can slide easily about the divider 30.

The first tab member 14 is attached to the belt 42 by a first bond 45, and the second tab member 16 is attached to the belt 42 by a second bond 46; the bonds 45, 46 are strips of adhesive. The first tab member 14 is in the form of a tray and may be used to contain item(s) such as items of clothing, jewelry, mobile telephones and associated accessories, cigarettes, compact discs, digital video discs, mini-discs, electronic components, pharmaceutical products, confectionery, chocolate, cosmetics and any other products which can be packaged in trays. As shown in FIG. 3(c) the first tab member 14 comprises two compartments 48, each of which is covered by a lid 50, which is optional. The first tab member 14 including its lids 50 may be printed with information, such as information about CD tracks, data on a CD, mobile telephone usage instructions or information about medicine contained within the tray. Alternatively, the second tab member 16 may only be in the form of a tray or both tab members 14, 16 may be in the form of a tray. It will be appreciated that both of the tab members 14, 16 may be in the form of a tab containing information or flat items only. The tab members 14, 16 could contain printed information or fabric swatch samples, so that the box 10 can be used as a display device and/or promotional tool.

When the first tab member 14 is pushed or pulled in the direction of arrow X from the fully closed position (as shown in FIG. 1(a)), the tab member 14 causes the belt 42 to turn about the divider 30 so that the second tab member 16 moves in the direction of arrow Y, away from the first tab member 14, towards a first open position as shown in FIG. 1(b). When the first tab member 14 is then pushed or pulled in the opposite direction (in the direction of arrow Y) back into the sleeve 12, the belt 42 is again caused to turn about the divider 30 in the opposite direction so that the second tab member 16 moves in the direction of arrow X, until both members are back in the fully closed position. Continued movement of the first tab member 14 in the direction of arrow Y causes the belt 42 to continue to turn about the divider until the tab members 14, 16 reach a second open position (FIG. 1(c)) where the first tab member 14 is fully extended in the Y direction and the second tab member 16 is fully extended in the X direction.

The tab members 14, 16 are able to open in both the X and Y directions by virtue of the starting positions of the bonds 45, 46 attaching the tab members 14, 16 to the belt 42. In the embodiment shown in FIGS. 1, 2 and 4, when in the fully closed position, the starting positions of the bonds 45, 46 are one above, or aligned with, the other and about halfway along the length of the divider 30 and the lengths of the tab members 14, 16. This means that the tab members 14, 16 can be pulled/pushed in either the X or Y directions from the fully closed position to one of two fully open positions shown in FIGS. 1(b) and (c). In the first fully open position shown in FIG. 1(b), the first and second tab members 14, 16 are extended fully out of the sleeve 12 in the X and Y directions respectively, and in the second fully open position shown in FIG. 1(c) the first and second tab members 14, 16 are extended fully out of the sleeve 12 in the Y and X directions respectively. The tab members 14, 16 are in a fully open or extended position when the bonds 45, 46 reach the end of the belt path at the end of the divider 30. By virtue of the starting positions of the bonds 45, 46, storage/display space on the tab members 14, 16 is maximised while the maximum extension (protrusion) of the tab members from the body of the box is minimised. It will be appreciated that this arrangement is better suited to the packaging of heavy objects.

A more detailed illustration of the relative movement between the tab members 14, 16 and the divider 30 can be seen in FIG. 4. When a user pulls/pushes the first tab member 14 in the direction of arrow X, the first tab member 14 causes the belt 42 to translate relative to the divider 30. The passage of the belt 42 causes the second tab member 16 to move in the direction of arrow Y. When the bonds 45, 46 reach the ends of the divider 30, as shown in FIG. 4(b), the first tab member 14 can be pulled/pushed no further in the direction of arrow X, and the second tab member 16 is then in one of the fully open positions (FIG. 4(b)). In other words, when the first tab member 14 is pulled out of the sleeve 12, translation of the belt 42 around the divider 30 stops when the bond 45 reaches the end of the belt path at the end of the divider 30.

When the user pushes the first tab member 14 in the direction of arrow Y, the first tab member 14 causes the belt 42 to translate in the opposite sense, so that the second tab member 16 moves in the direction of arrow X. The first tab member 14 can be pushed no further in the direction of arrow Y when the bonds 45, 46 reach the ends of the divider 30, as shown in FIG. 4(c). In other words, when the first tab member 14 is pushed back into the sleeve 12, translation of the belt 42 stops when the bond 45 reaches the end of the belt path at the end of the divider 30. If required the user can push the second tab member 16 in the direction of arrow Y to the fully closed position. The effect is the same, in that both the first and second tab members 14, 16 will return to the fully closed position.

In this embodiment, the distance between opposite ends of the belt path of the divider 30 defines the maximum movement of each of the first and second tab members 14, 16. The movement of the first and second tab members 14, 16 with respect to the lower and upper faces 36, 34 of the divider 30 is delimited by the bonds 45, 46 reaching the end of the belt path at either end of the divider 30. The length of the belt path must therefore be chosen such that the travel of the tab members 14, 16 is sufficient to give access to the contents of the tab members 14, 16 when in the fully open positions.

FIG. 5 shows an embodiment of the invention in which the bonds 45, 46 are offset from one another when the tab members 14 and 16 are each in closed positions (FIG. 5(a)). The bonds 45, 46 are offset such that they are substantially equidistant from a plane Z which intersects the divider 30 orthogonally at a position substantially midway between the ends 37, 39 of the belt path. As shown in FIG. 5(b), the first tab member 14 can be moved in the direction of arrow X, causing the second tab member 16 to move in the direction of arrow Y, by a first maximum amount before the respective bonds 45 and 46 reach respective opposite ends 39, 37 of the belt path, thereby preventing further movement of the tab members 14, 16 in the aforesaid directions. The box 10 in FIG. 5(b) is in a first fully open position, with the tab members 14, 16 projecting from opposite ends of the sleeve 12 to a first maximum extent as indicated by the double-headed arrows 47.

Referring now to FIG. 5(c), the first tab member 14 can be moved in the direction of arrow Y, causing the second tab member 16 to move in the direction of arrow X, by a second maximum amount before the respective bonds 45 and 46 reach respective opposite ends 37, 39 of the belt path, thereby preventing further movement of the tab members 14, 16 in the aforesaid directions. The box 10 in FIG. 5(c) is in a second fully open position, with the tab members 14, 16 projecting from opposite ends of the sleeve 12, to a second maximum extent as indicated by the double-headed arrows 49.

From a comparison of FIGS. 5(b) and (c), it can be seen that the first tab member 14 can be moved to a greater extent in the direction of arrow X than in the direction of arrow Y, whereas the second tab member 16 can be moved to a greater extent in the direction of arrow Y than in the direction of arrow X; in other words, the first maximum amount is greater than the second maximum amount. This asymmetry results from the offset of the bonds 45, 46 as shown in FIG. 4(a), and enables the tab members 14, 16 to project from the sleeve 12 to a greater extent when the box 10 is in the first fully open position (FIG. 5(b)), than when the box 10 is in the second fully open position (FIG. 5(c)).

Figure 6:
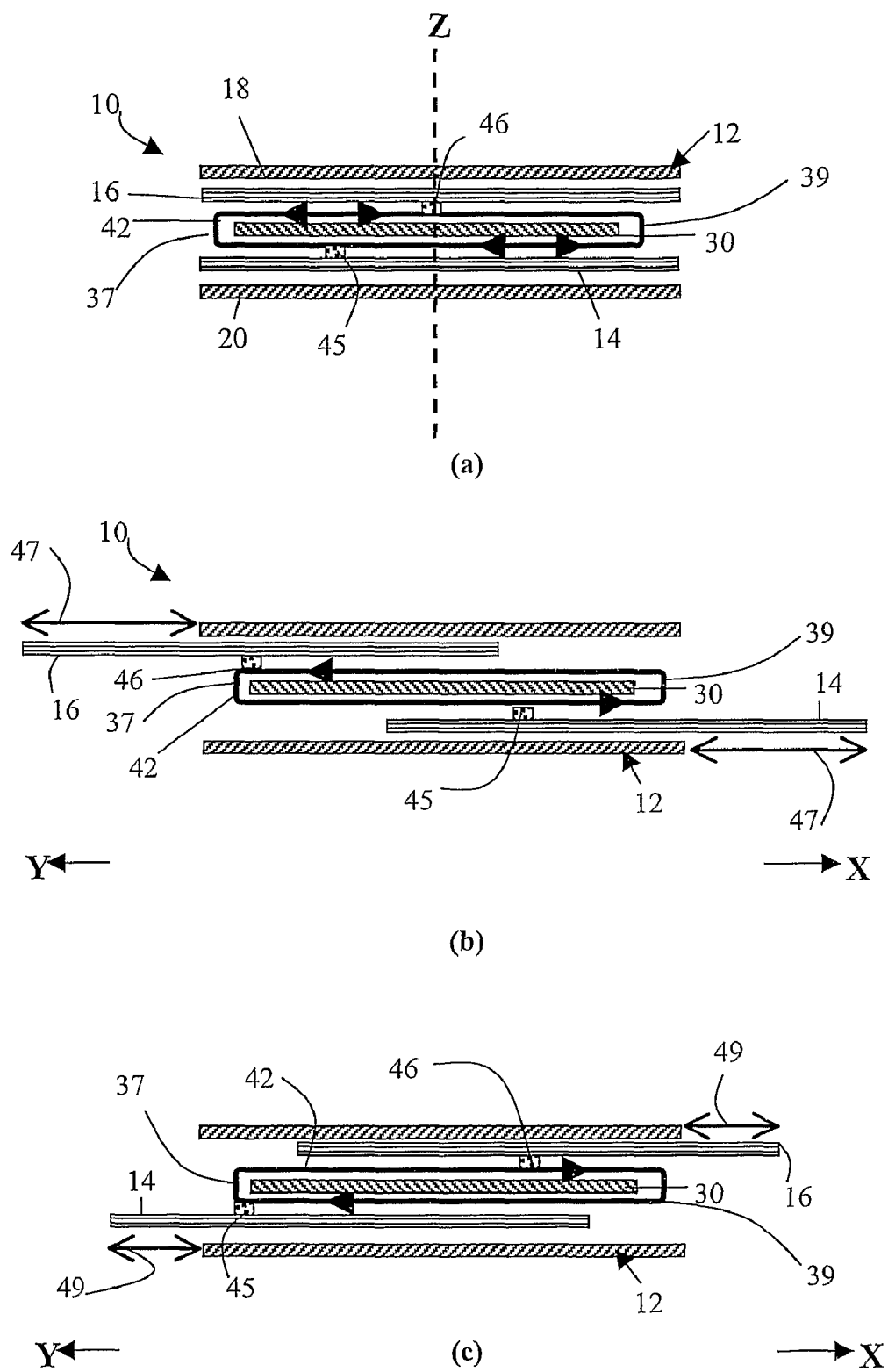

A further embodiment of the invention is shown in FIG. 6, in which the bonds 45, 46 are offset from one another, but are not equidistant from the plane Z. In this embodiment, and as shown in FIG. 6(b), movement of the first tab member 14 in the direction of arrow X, and movement of the second tab member 16 in the direction of arrow Y, is delimited by the second bond 46 reaching an end 37 of the belt path, despite the first bond 45 not reaching the other end 39 of the belt path. At this point, the box 10 is in the first fully open position, whereby the tab members 14, 16 project from the sleeve 12 to a first maximum extent as indicated by the double-headed arrows 47.

As shown in FIG. 6(c), movement of the first tab member 14 in the direction of arrow Y, and movement of the second tab member 16 in the direction of arrow X, is delimited by the first bond 45 reaching an end 37 of the belt path despite the second bond 46 not reaching the other end 39 of the belt path. At this point, the box 10 is in the second fully open position, whereby the tab members 14, 16 project from the sleeve 12 to a second maximum extent as indicated by the double-headed arrows 49. The second maximum extent 49 is less than the first maximum extent 47 (FIG. 6(b)), and again this asymmetry results from the offset bonds 45, 46 as shown in FIG. 6(a).

To summarise, the bonds 44, 46 need not be exactly aligned with one another. In other words, the fully open position can be reached when only one of the bonds associated with a tab/tray member reaches the end of the divider 30. Offsetting the bonds 45, 46 from one another along the length of the belt path in this way allows the tab members 14, 16 to each be moved to different maximum extents in the first and second directions respectively.

As shown in FIG. 7, the sleeve 12 can be made by folding and gluing a single flat blank manufactured by cutting and creasing from a sheet material such as plastic, cardboard or folding box board, as can be seen in FIG. 5. The blank comprises three panels 76, 78, 80 and is scored along four lines 82, 84, 86, 88. The panel 76 is folded over and is attached to the underside of panel 80 to form the lower wall of the sleeve. The portions between score lines 82 and 84, and 86 and 88 form the side walls 22, 24 of the sleeve 12.

By virtue of corresponding cut-outs at an end of each of the panels 76, 80, the lower wall of the sleeve 12 has an oblong cut-out 90 portion at one end. This cut-out 90 enables the user of the box 10 to hold an end portion of one of the first or second tab members 14, 16 by grasping it on both sides and pulling the tab member in the direction of arrow X. It will be appreciated that other shapes are also possible. In another embodiment of the present invention, shown in FIG. 8, the upper wall 18 of the sleeve 12 has a semi-circular cut-out 92 at the same end as the cut-out 90. This further eases grasping of a tab member 14, 16.

The sleeve 12 can have a finish applied by foil blocking and embossing. The box/packaging could be provided with a wipe-clean finish by printing a varnish onto the print surface or by film laminating. Preferably, there is no forcible locking device on the packaging, so that the product can be loaded or unloaded easily, making the package suitable for the elderly and infirm.

The present invention may be embodied in other specific forms without departing from its essential attributes as defined in the appended claims and other statements of invention herein. For example, the belts need not be continuous loops but could be strips associated with the tab members and arranged to co-operate with each other such that translation of one tab member causes the other tab member to move. The sleeve may be any other type of frame. The tab/tray members 14, 16 need not necessarily be housed wholly in the sleeve 12; the tab/tray members 14, 16 may be shaped and/or sized so that portion(s) of the tab/tray members 14, 16 remain outside the sleeve 12. The form of the first tab member may differ from that shown in FIG. 3(*c*), for example, it may have only one compartment, or it may have more than one compartment in the form of sub divisions or otherwise. The tab/tray members 14, 16 may take any configuration and not necessarily that shown in FIG. 3(*c*). The packaging can be made in many shapes and sizes and of various different materials, and is not limited to the shapes shown in the Figures.

The invention claimed is:

1. A package comprising:
   a sleeve having opposed open ends forming an open passage,
   a divider disposed in said sleeve and dividing said passage into upper and lower passages;
   a belt disposed around said divider and extending between a first end and a second end of a belt path within said sleeve;
   first and second tab members having opposing first and second ends, each of said tab members being attached to the belt such that when the first tab member is moved in a first direction, the second tab member is driven by the belt to move in a second direction different to the first direction;
   wherein the tab members are attached to the belt by respective bonds, the movement of the tab members in either direction being delimited by at least one bond reaching an end of the belt path; and
   wherein at least one of said tab members is adapted to move from a first open position in which a first end of said tab member extends out of said sleeve to a second open position in which said second opposing end of said tab member extends out of said sleeve.

2. The package of claim 1, wherein the bond that delimits movement of the first tab member is positioned substantially midway between the ends of the belt path when the first tab member is in a fully closed position.

3. The package of claim 1, wherein the respective bonds are offset from one another when each of the tab members is in fully closed position.

4. The package of claim 3, wherein, in said fully closed position, the bonds are substantially equidistant from a plane which intersects the divider orthogonally at a position substantially midway between the ends of the belt path.

5. The package of claim 3, wherein, in said fully closed position, the bonds are offset to different extents from a plane which intersects the divider orthogonally at a position substantially midway between the ends of the belt path.

6. The package of claim 3, wherein the tab members are arranged to be moveable to different maximum extents in the first and second directions respectively, from fully closed positions.

7. The package of claim 1, wherein when one of the tab members is in a closed position, said tab member overlies the belt path.

8. The package of claim 1, wherein when both of the tab members are in respective closed positions, the tab members together sandwich the belt path.

9. The package of claim 8, wherein at least one tab member is longer than or equal to the length of the belt path.

10. The package of claim 1 wherein at least one of the tab members is wholly or substantially within the sleeve when in a fully closed closed position and can protrude from the sleeve through one or other of the open ends when moved in either of the first and second directions.

11. The package of claim 10, wherein at least one of the tab members is shorter than or equal to the length of the sleeve.

12. The package of claim 11, wherein at least one of the tab members comprises an extended portion which projects from the sleeve when the tab member is in the fully closed position.

13. The package of claim 10 wherein when both of the tab members are in respective closed positions, upper and lower walls of the sleeve together sandwich the tab members and the belt path.

14. The package of claim 1, wherein the first and second directions are opposing directions whereby the first and second tab members are caused to move away from and towards each other.

15. The package of claim 1, wherein the belt is a continuous loop which extends around said divider.

16. The package of claim 1, wherein at least one of the tab members is a tray.

17. The package of claim 1, wherein at least one tab member comprises a blister pack.

18. A package comprising:
   a sleeve having opposed open ends forming an open passage;
   a divider disposed in said sleeve and dividing said passage into upper and lower passages;

a belt disposed around said divider and extending between a first end and a second end of a belt path within said sleeve;

first and second tab members having opposing first and second ends, each of said tab members being attached to the belt such that when the first tab member is moved in a first direction, the second tab member is driven by the belt to move in a second direction different to the first direction;

wherein the tab members are attached to the belt by respective bonds, the movement of the tab members in either direction being delimited by at least one bond reaching an end of the belt path;

wherein at least one of said tab members is adapted to move from a first open position in which a first end of said tab member extends out of said sleeve to a second open position in which said second opposing end of said tab member extends out of said sleeve;

wherein the belt is a continuous loop which extends around said divider; and wherein at least one tab member comprises a blister pack.

19. The package of claim 18 wherein the respective bonds are offset from one another when each of the tab members is in a fully closed position.

* * * * *

UNITED STATES PATENT AND TRADEMARK OFFICE
CERTIFICATE OF CORRECTION

PATENT NO. : 8,225,931 B2
APPLICATION NO. : 12/161755
DATED : July 24, 2012
INVENTOR(S) : Burga Wharton Page 1 of 1

It is certified that error appears in the above-identified patent and that said Letters Patent is hereby corrected as shown below:

Col. 8, Claim 10, Line 41, "fully closed closed" should read --fully closed--

Signed and Sealed this
Twelfth Day of March, 2013

Teresa Stanek Rea
*Acting Director of the United States Patent and Trademark Office*